United States Patent
Taylor et al.

(10) Patent No.: US 9,121,350 B2
(45) Date of Patent: Sep. 1, 2015

(54) SEAL ARRANGEMENT AND A METHOD OF REPAIRING A SEAL ARRANGEMENT

(71) Applicant: ROLLS-ROYCE PLC, London (GB)

(72) Inventors: Jonathan M. Taylor, Derby (GB); Benjamin Shaw, Sheffield (GB)

(73) Assignee: ROLLS-ROYCE PLC, London (GB)

( * ) Notice: Subject to any disclaimer, the term of this patent is extended or adjusted under 35 U.S.C. 154(b) by 238 days.

(21) Appl. No.: 13/750,703

(22) Filed: Jan. 25, 2013

(65) Prior Publication Data

US 2013/0134682 A1 May 30, 2013

Related U.S. Application Data

(62) Division of application No. 12/757,608, filed on Apr. 9, 2010, now Pat. No. 8,408,557.

(30) Foreign Application Priority Data

Apr. 29, 2009 (GB) .................................. 0907278.6

(51) Int. Cl.
*B23P 19/04* (2006.01)
*F02C 7/28* (2006.01)
(Continued)

(52) U.S. Cl.
CPC . *F02C 7/28* (2013.01); *B23P 6/002* (2013.01); *F16J 15/062* (2013.01); *F16J 15/104* (2013.01); *Y10T 29/4973* (2015.01); *Y10T 29/49719* (2015.01)

(58) Field of Classification Search
CPC ......... F16J 15/02; F16J 15/062; F16J 15/104; F16J 15/12; F16J 15/14; F02C 7/28; B23P 6/002; Y10T 29/4973; Y10T 29/49719
See application file for complete search history.

(56) References Cited

U.S. PATENT DOCUMENTS

| 4,956,525 A | 9/1990 | Wilk |
| 5,359,148 A | 10/1994 | Okase et al. |

(Continued)

FOREIGN PATENT DOCUMENTS

| GB | 2 391 914 A | 2/2004 |
| JP | A-09-183676 | 7/1997 |

(Continued)

OTHER PUBLICATIONS

British Search Report dated Jan. 18, 2010 from British Patent Application No. GB0907278.6.

(Continued)

*Primary Examiner* — Ryan J Walters
(74) *Attorney, Agent, or Firm* — Oliff PLC

(57) ABSTRACT

The seal arrangement is arranged between the casing portions and a fluoropolymer O-ring seal is positioned between the casing portions. A first protecting member is positioned between the fluoropolymer O-ring seal and the casing portion and the first protecting member consists of a polymer and hydroxyapatite. The first protecting member consists of 50 to 80 wt % polymer and 20 to 50 wt % hydroxyapatite and incidental impurities. The first protecting member is located in an annular groove and is thus arranged between the casing portion and the fluoropolymer O-ring seal. The first protecting member is substantially U-shaped in cross-section and the fluoropolymer O-ring seal is positioned between the legs of the U-shaped cross-section first protecting member. The first protecting member prevents corrosion of the casing portion by the fluoropolymer O-ring seal.

15 Claims, 3 Drawing Sheets

(51) Int. Cl.
*F16J 15/06* (2006.01)
*F16J 15/10* (2006.01)
*B23P 6/00* (2006.01)

(56) References Cited

U.S. PATENT DOCUMENTS

| | | | |
|---|---|---|---|
| 5,873,163 | A | 2/1999 | Diefenthaler et al. |
| 2003/0094237 | A1 | 5/2003 | Ogle et al. |
| 2005/0218606 | A1 | 10/2005 | Sakazaki et al. |
| 2005/0230971 | A1 | 10/2005 | Sakazaki et al. |
| 2006/0222884 | A1* | 10/2006 | Nagaraj et al. ............... 428/688 |
| 2008/0107888 | A1 | 5/2008 | Dry |
| 2010/0276895 | A1 | 11/2010 | Taylor et al. |

FOREIGN PATENT DOCUMENTS

| | | |
|---|---|---|
| JP | A-2006-029376 | 2/2006 |
| WO | WO 2008/056743 A1 | 5/2008 |

OTHER PUBLICATIONS

European Search Report dated Jan. 19, 2011 from European Patent Application No. 10 15 8418.

* cited by examiner

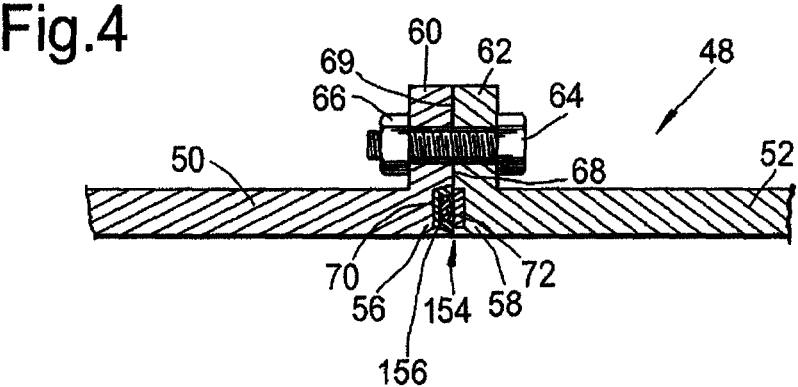
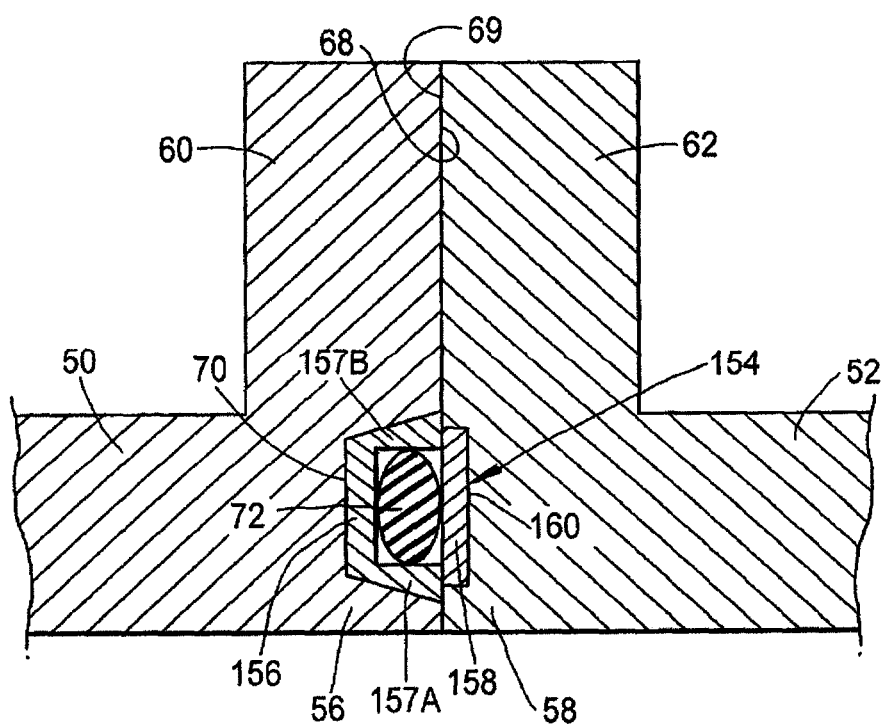

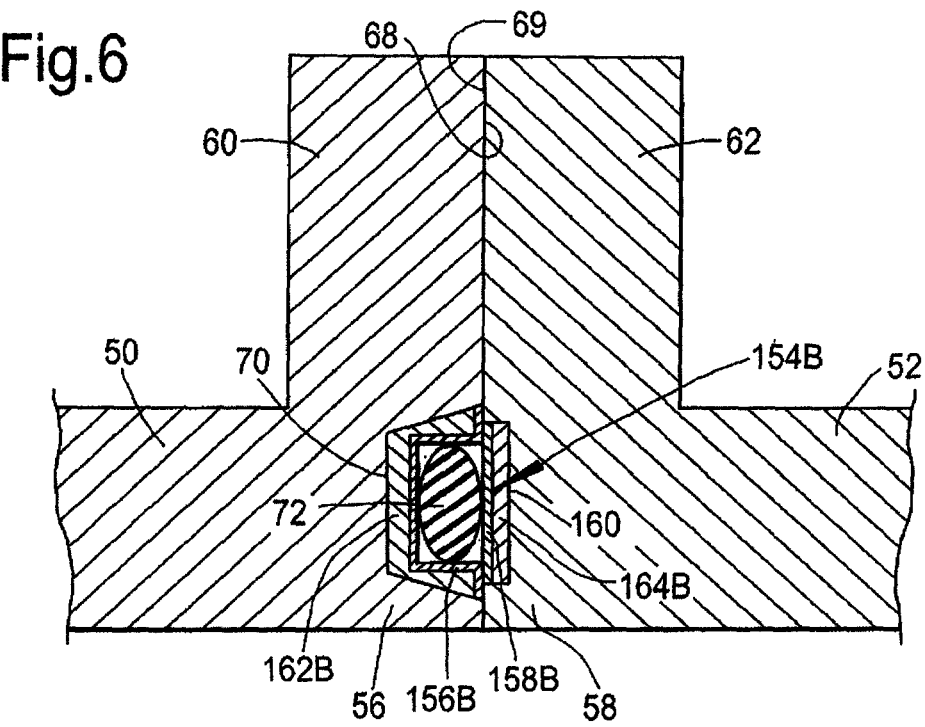
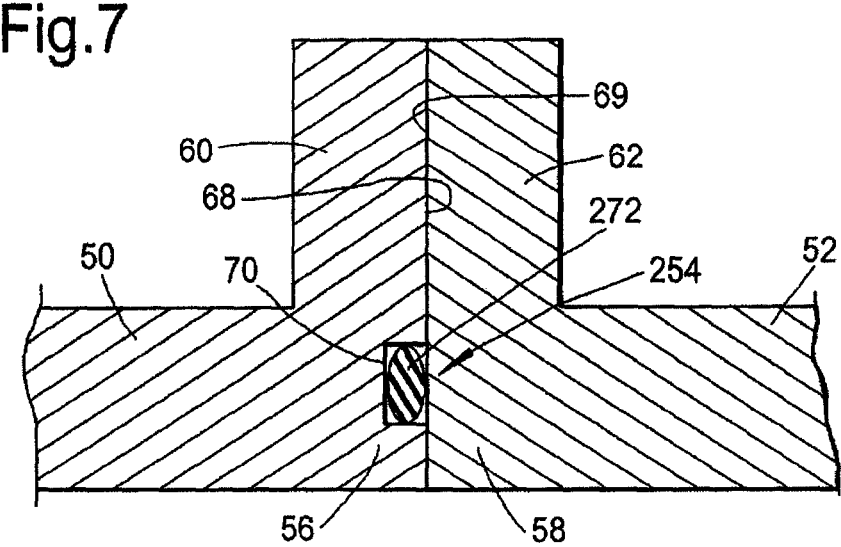

SEAL ARRANGEMENT AND A METHOD OF REPAIRING A SEAL ARRANGEMENT

This is a Division of U.S. application Ser. No. 12/757,608 filed Apr. 9, 2010, which claims the benefit of Application GB 0907278.6 filed Apr. 29, 2009. Each of the disclosures of the prior applications is hereby incorporated by reference herein in its entirety.

The present invention relates to a seal arrangement and a method of repairing a seal arrangement and in particular to a seal arrangement between components in a gas turbine engine.

It is known to provide a seal between components in a gas turbine engine particularly an air/oil seal, e.g. an O-ring seal between metal casings in a gas turbine engine or in an oil/lubrication system of a gas turbine engine. A known type of seal provided between adjacent components in a gas turbine engine comprises a fluoropolymer seal. A problem with a fluoropolymer seal is that the fluorine, or fluorine-containing species, in the fluoropolymer seal corrodes the adjacent components, after the fluoropolymer seal has degraded at elevated temperatures above 200° C., and this may lead to surface pitting and sub-surface inter-granular stress-corrosion cracking of the adjacent components. If the components are sufficiently corroded it is necessary to repair either one or both of the adjacent components.

Accordingly the present invention seeks to provide a novel seal arrangement which reduces, preferably overcomes, the above mentioned problem.

Accordingly the present invention provides a seal arrangement between a first component and a second component, a fluoropolymer seal member is positioned between the first component and the second component and a first protecting member is positioned between the fluoropolymer seal member and the first component, the first protecting member consisting of a polymer and hydroxyapatite or apatite.

Preferably a second protecting member is positioned between the fluoropolymer seal member and the second component, the second protecting member consisting of a polymer and hydroxyapatite or apatite.

The first member may consist of 50 to 80 wt % polymer and 20 to 50 wt % hydroxyapatite and incidental impurities.

The second member may consist of 50 to 80 wt % polymer and 20 to 50 wt % hydroxyapatite and incidental impurities.

Preferably the polymer consists of polyimide.

Preferably the first component has a recess, the first protecting member is located in the recess between the first component and the fluoropolymer seal member.

Preferably the first protecting member is substantially U-shaped in cross-section and the fluoropolymer seal member is positioned between the legs of the U-shaped cross-section first protecting member.

Preferably the second component has a recess, the second protecting member is located in the recess between the second component and the fluoropolymer seal member.

Preferably the first protecting member is a moulded member. Alternatively the first protecting member is a coating.

Preferably the second protecting member is a moulded member. Alternatively the second protecting member is a coating.

Preferably the first component and the second component comprise a metal. Preferably the metal comprises titanium, a titanium alloy, iron, steel, nickel, a nickel alloy, aluminium, an aluminium alloy or a metal matrix composite.

Preferably the first component and the second component comprise gas turbine engine components.

Preferably the first component and the second component comprise annular members or cylindrical members. Preferably the first component and the second component are casings.

The present invention also provides a seal arrangement between a first component and a second component, a fluoropolymer seal member is positioned between the first component and the second component and the fluoropolymer seal member consisting of a fluoropolymer and hydroxyapatite or apatitie.

The present invention also provides a method of repairing a seal arrangement between a first component and a second component, a fluoropolymer seal member is positioned between the first component and the second component, the method comprising the steps of:—
(a) disassembling the seal arrangement,
(b) removing the fluoropolymer seal member from between the first component and the second component,
(c) removing corroded material from the first component, and
(d) positioning a first protecting member between the fluoropolymer seal member and the first component, the first protecting member consisting of a polymer and hydroxyapatite or apatite.

Preferably step (c) comprises machining the corroded material from the first component.

Preferably step (d) comprises positioning a moulded first protecting member in a recess in the first component. Preferably the first protecting member is substantially U-shaped in cross-section.

Alternatively step (d) comprises depositing new material on the first member to form a recess and depositing a coating on the surface of the recess to form the first protecting member.

The first member may consist of 50 to 80 wt % polymer and 20 to 50 wt % hydroxyapatite and incidental impurities.

Preferably the polymer consists of polyimide.

Preferably the first component and the second component comprise a metal. Preferably the metal comprises titanium, a titanium alloy, iron, steel, nickel, a nickel alloy, aluminium, an aluminium alloy or a metal matrix composite.

Preferably the first component and the second component comprise gas turbine engine components.

Preferably the first component and the second component comprise annular members or cylindrical members. Preferably the first component and the second component are casings.

The present invention will be more fully described by way of example with reference to the accompanying drawings in which:—

FIG. 4 shows a casing of the turbofan gas turbine engine having a seal arrangement according to the present invention.

FIG. 5 is an enlarged cross-sectional view through a part of the casing and the seal arrangement according to the present invention shown in FIG. 4.

FIG. 6 is an enlarged cross-sectional view through a part of the casing and an alternative seal arrangement according to the present invention shown in FIG. 4.

FIG. 7 is an enlarged cross-sectional view through a part of the casing and a further seal arrangement according to the present invention shown in FIG. 4.

Figure 1:
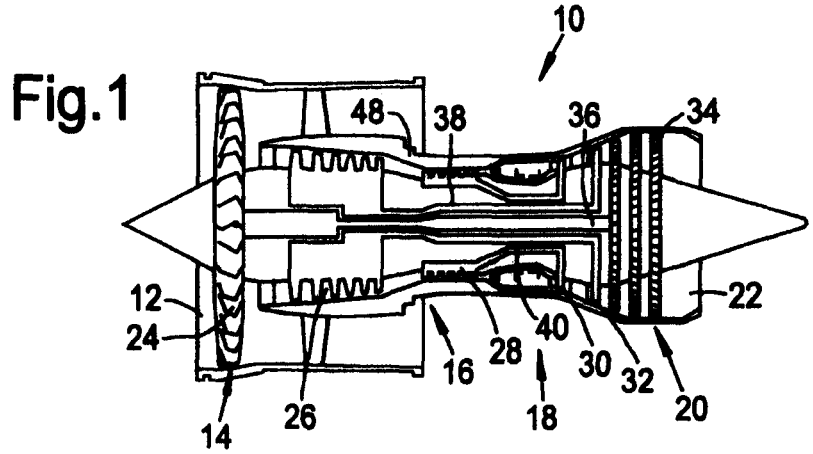
FIG. 1 shows a turbofan gas turbine engine having a seal arrangement according to the present invention.

A turbofan gas turbine engine 10, as shown in FIG. 1, comprises in axial flow series an inlet 12, a fan section 14, a compressor section 16, a combustion section 18, a turbine section 20 and an exhaust 22. The fan section 14 comprises a fan 24 and the compressor section 16 comprises an intermediate pressure compressor 26 and a high pressure compressor 28. The turbine section 20 comprises a high pressure turbine 30, an intermediate pressure turbine 32 and a low pressure turbine 34. The low pressure turbine 34 is arranged to drive the fan 24 via a first shaft 36, the intermediate pressure turbine 32 is arranged to drive the intermediate pressure compressor 26 via a second shaft 38 and the high pressure turbine 30 is arranged to drive the high pressure compressor 28 via a third shaft 40. FIG. 1 also shows a compressor casing 48 for the intermediate and high pressure compressors 26 and 28 respectively. The turbofan gas turbine engine 10 operates quite conventionally and its operation will not be discussed further.

Figure 2:
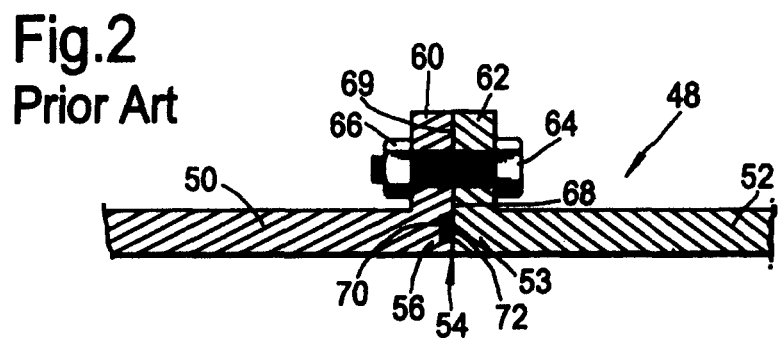
FIG. 2 shows a casing of the turbofan gas turbine engine having a seal arrangement according to the prior art.
Figure 3:
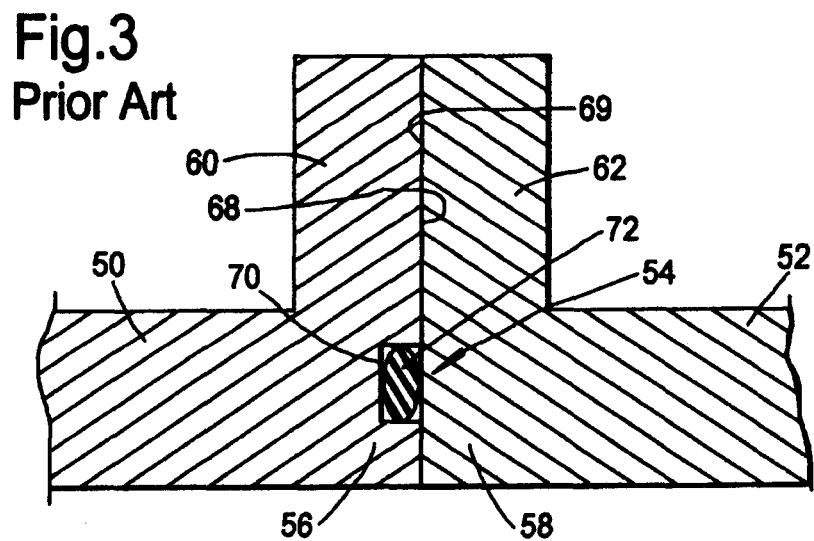
FIG. 3 is an enlarged cross-sectional view through a part of the casing and the seal arrangement according to the prior art shown in FIG. 2.

The compressor casing 48 comprises two axially adjacent casing portions 50 and 52 and a prior art seal arrangement 54 is provided between the casing portions 50 and 52 as shown more clearly in FIGS. 2 and 3. The adjacent axial ends 56, 58 of the casing portions 50 and 52 respectively have radially extending flanges 60, 62 and the flanges 60, 62 are fastened together by a plurality of bolts 64 and nuts 66. An end surface 68 of the casing 50 and flange 60 is provided with a circumferentially extending annular recess, or annular groove, 70 and an O-ring seal 72 is provided in the annular groove 72 to provide a seal between the surfaces 68 and 69 on the flanges 60, 62 of the axially adjacent casing portions 50 and 52. The O-ring seal 72 consists of a fluoropolymer, i.e. a polymer containing fluorine. As mentioned previously, fluorine containing species liberated from the fluoropolymer O-ring seal 72 corrode the adjacent surfaces of the casing portions 50 and 52 once the fluoropolymer O-ring seal 72 has been degraded at temperatures above 200° C.

A seal arrangement 154 according to the present invention is shown in FIGS. 4 and 5. The seal arrangement 154 is generally the same as that shown in FIGS. 2 and 3, and like parts are denoted by like numerals. The seal arrangement 154 is arranged between the casing portions 50 and 52 and a fluoropolymer O-ring seal 72 is positioned between the casing portions 50 and 52. The present invention provides a first protecting member 156 positioned between the fluoropolymer O-ring seal 72 and the casing portion 50 and the first protecting member 156 consists of a polymer and hydroxyapatite. The first protecting member consists of 50 to 90 wt % polymer and 10 to 50 wt % hydroxyapatite and incidental impurities, more preferably 50 to 80 wt % polymer and 20 to 50 wt % hydroxyapatite and incidental impurities, and the hydroxyapatite powder has a particle size of about 100 micrometers. The first protecting member 156 is located in the annular groove 70 and is thus arranged between the casing portion 50 and the fluoropolymer O-ring seal 72. The first protecting member 156 is substantially U-shaped in cross-section and the fluoropolymer O-ring seal 72 is positioned between the legs 157A, 157B of the U-shaped cross-section first protecting member 156.

A second protecting member 158 is positioned between the fluoropolymer O-ring seal 72 and the casing portion 52 and the second protecting member 158 consists of a polymer and hydroxyapatite. The second member 158 also consists of 50 to 90 wt % polymer and 10 to 50 wt % hydroxyapatite and incidental impurities, more preferably 50 to 80 wt % polymer and 20 to 50 wt % hydroxyapatite and incidental impurities, and the hydroxyapatite powder has a particle size of about 100 micrometers. The casing portion 52 is also provided with a circumferentially extending annular recess, or annular groove, 160 in the surface 69 on the end of the flange 62 and casing portion 52. The second protecting member 158 is located in the annular groove 160 and is thus between the casing portion 52 and the fluoropolymer O-ring seal 72.

The polymer in the protecting members 156 and 158 consists of polyimide, although other suitable polymers may be used depending on the temperature requirements of the protecting members 156 and 158. In this embodiment of the present invention the first protecting member 156 is a moulded member and the second protecting member 158 is a moulded member. Polyimide precursor monomers and anhydrous hydroxyapatite powder of particle size around 100 micrometers are mixed together and then injected into a mould in the shape of the first protecting member. The mixture is cured at an appropriate temperature and time, for example it is cured at a temperature of 320° C. at a mould pressure of 200 pounds per square inch, 1379 kPa. The finished first protecting member is removed from the mould and optionally may be post-cure heat treated at 360° C. at atmospheric pressure in air to increase temperature capability.

The casing portions may comprise a metal, for example the metal comprises titanium, a titanium alloy, iron, steel, nickel, a nickel alloy, aluminium, an aluminium alloy or a metal matrix composite e.g. a titanium alloy consisting of 6 wt % aluminium, 4 wt % vanadium and the balance titanium, minor additions and incidental impurities.

The first protecting member 156 may be used to repair a used seal arrangement 54 which has suffered from corrosion. The seal arrangement 54 is firstly dis-assembled, and then the fluoropolymer O-ring seal member 72 is removed from between the casing portions 50 and 52. Corroded material is removed from the casing portion 50 and then a first protecting member 156 is positioned between the fluoropolymer O-ring seal 72 and the casing portion 50, the first protecting member 156 consists of a polymer and hydroxyapatite. The corroded material is removed from the casing portion 50 by machining or other suitable technique. The first protecting member 156 is a pre-moulded component and is positioned in the annular groove 70 in the casing portion 50. Preferably the first protecting member 156 is substantially U-shaped in cross-section as mentioned above. Thus the present invention increases the depth of an existing annular groove 70 in the casing portion 50 and then provides the first protecting member 156 to redefine the annular groove for the fluoropolymer O-ring seal 72. A fluoropolymer O-ring seal 72 is then repositioned between the casing portions 50 and 52 with the first protecting member 156 positioned between the fluoropolymer O-ring seal 72 and the casing portion 50, Similarly corroded material may be removed from the casing portion 52 to define an annular groove 160 and then a second protective member 158B is provided in the annular groove 160 between the casing portion 52 and the fluoropolymer O-ring seal 72.

Although two protecting members have been described it may be possible to provide only one of the protecting members.

An alternative seal arrangement 154B according to the present invention is shown in FIGS. 4 and 6. The seal arrangement 154B is generally the same as that shown in FIGS. 4 and 5, and like parts are denoted by like numerals. This seal arrangement 154B differs in that the first protecting member 156B is a coating and the second protecting member 158B is a coating.

The first protecting member 156B may be used to repair a used seal arrangement 54 which has suffered from corrosion. The seal arrangement 54 is firstly dis-assembled, and then the fluoropolymer O-ring seal member 72 is removed from between the casing portions 50 and 52. Corroded material is removed from the casing portion 50. New material 162B is deposited on the casing portion 50 to reform the annular groove 70 and then a coating is deposited on the surface of the new material 162B defining the annular groove 70 to form the first protecting member 156B. A fluoropolymer O-ring seal 72 is then repositioned between the casing portions 50 and 52 with the first protecting member 156B positioned between the fluoropolymer O-ring seal 72 and the casing portion 50, the first protecting member 156 consists of a polymer and hydroxyapatite. The corroded material is removed from the casing portion 50 by machining or other suitable technique. Preferably the first protecting member 156B is substantially U-shaped in cross-section. Thus the present invention increases the depth of an existing annular groove 70 in the casing portion 50 and then reforms the annular groove 70 with new material 162B to redefine the annular groove 70 for the fluoropolymer O-ring seal 72 and provides a thin coating of first protecting member 156B in the annular groove 70.

Similarly corroded material may be removed from the casing portion 52 to define an annular groove 160 and then new material 164B is deposited to substantially fill the annular groove 160 and then a thin coating of second protective member 158B is provided onto the new material 164B. The first and second protective members 156B and 158B consist of 75 to 90 wt % polymer and 10 to 25 wt % hydroxyapatite and incidental impurities The new material 162B and 164B may be deposited by any suitable method, for example plasma spraying, direct laser deposition, weld metal deposition etc and the new material is preferably the same as the material of the casing portion 50 or 52, but may be different.

In a further embodiment of the present invention, the seal arrangement is substantially the same as that shown in FIGS. 2 and 3, and like parts are denoted by like numerals. In FIG. 7 the fluoropolymer O-ring seal 254 is positioned between the casing portions 50 and 52 the fluoropolymer O-ring seal 254 is positioned between the casing portion 50 and the casing portion 52 and the fluoropolymer O-ring seal 254 consists of a fluoropolymer and hydroxyapatite. The fluoropolymer O-ring seal 254 is positioned in the annular groove 70 in the surface 68 at the axial end of the casing portion 50 and flange 60.

The seal arrangement may be an air/gas seal or a liquid seal, e.g. lubricant/oil seal, or an air/oil seal or a fuel seal or a hydraulic fuel seal.

The hydroxyapatite powder in the first protecting member and/or second protecting member and/or fluoropolymer O-ring seal scavenges free fluoride ions and/or volatile fluorine containing species, e.g. hydrogen fluoride, from the surrounding environment. This occurs even though the hydroxyapatite is encased in the polymer, polyimide, matrix because fluoride ions are exceptionally small and mobile and they rapidly diffuse through close-packed atomic structures, while the polymer, polyimide, matrix has a relatively open structure with only limited long-range order. The hydroxyapatite may be used to protect metal components and other components from the corrosive action of fluorine containing seal members.

Although the present invention has been described with reference to a fluoropolymer O-ring seal between two casing portions it is equally possible to provide a fluoropolymer O-ring seal between two annular members or between two cylindrical members. It may also be possible to provide a fluoropolymer seal between a first component and a second component. The present invention is also applicable to other types of seals for example gasket seals, D-ring seals, spring-energised seals or other seals consisting of a fluoropolymer.

Although the present invention has been described with reference to gas turbine engine components it is equally suitable for use for seals with internal combustion engine components, e.g. diesel engine components, and other components.

The amount of hydroxyapatite added to the polymer of the first protective member, second protective member or fluoropolymer seal member is varied depending on the degree of severity of the corrosive environment, which tends to increase the amount of hydroxyapatite added, and the degree of mechanical strength required, which tends to decrease the amount of hydroxyapatite added.

Although the present invention has been described with reference to the use of hydroxyapatite it may also be possible to use apatite in place of hydroxyapatite.

The invention claimed is:

1. A method of repairing a seal arrangement between a first component and a second component, a fluoropolymer seal member is positioned between the first component and the second component, the method comprising the steps of:—
    (a) disassembling the seal arrangement,
    (b) removing the fluoropolymer seal member from between the first component and the second component,
    (c) removing corroded material from the first component, and
    (d) positioning a first protecting member between the fluoropolymer seal member and the first component, the first protecting member consisting of a polymer and hydroxyapatite or apatite,
    wherein the first component comprises a metal wherein the first component has a first recess and the fluoropolymer seal is positioned in the recess, step (c) comprises increasing a depth of the first recess in the first component and step (d) comprises positioning the first protecting member in the first recess such that the first protecting member is between the fluoropolymer seal member and the first component.

2. A method as claimed in claim 1 wherein step (c) comprises machining the corroded material from the first component.

3. A method as claimed in claim 1 wherein in step (d), the first protecting member is a molded member.

4. A method as claimed in claim 1 wherein the first protecting member is substantially U-shaped in cross-section.

5. A method as claimed in claim 1 wherein the first protecting member consists of 50 to 80 wt % polymer and 20 to 50 wt % hydroxyapatite and incidental impurities.

6. A method as claimed in claim 1 wherein the polymer consists of polyimide.

7. A method as claimed in claim 1 wherein the fluoropolymer seal is positioned in the first recess, step (c) comprises increasing a depth of the first recess in the first component and step (d) comprises depositing new material within the first recess in the first component to form a recess having a surface, and depositing a coating on the surface of the recess to form the first protecting member such that the first protecting member is between the fluoropolymer seal member and the first component.

8. A method as claimed in claim 1 wherein the first component and the second component comprise gas turbine engine components.

9. A method as claimed in claim 1 wherein the first component and the second component comprise annular members.

10. A method as claimed in claim 1 wherein the metal is selected from the group consisting of titanium, a titanium alloy, iron, steel, nickel, a nickel alloy, aluminum, an aluminum alloy and a metal matrix composite.

11. A method of repairing a seal arrangement between a first metal component and a second metal component, a fluoropolymer seal member being positioned between the first metal component and the second metal component, the method comprising the steps of:
- (a) disassembling the seal arrangement,
- (b) removing the fluoropolymer seal member from between the first metal component and the second metal component,
- (c) removing corroded material from the first component,
- (d) positioning a first protecting member between the fluoropolymer seal member and the first metal component, the first protecting member consisting of a polymer and hydroxyapatite or apatite,
- (e) removing corroded material from the second component, and
- (f) positioning a second protecting member between the fluoropolymer seal member and the second metal component, the second protecting member consisting of a polymer and hydroxyapatite or apatite wherein the first metal component has a first recess and the fluoropolymer seal is positioned in the recess, step (c) comprises increasing a depth of the first recess in the first metal component and step (d) comprises positioning the first protecting member in the first recess such that the first protecting member is between the fluoropolymer seal member and the first metal component.

12. A method as claimed in claim 11 wherein step (e) comprises forming a second recess in the second component and step (f) comprises positioning the second protecting member in the second recess such that the second protecting member is between the fluoropolymer seal member and the second component.

13. A method as claimed in claim 12 wherein step (f) comprises depositing new material within the second recess in the second component to substantially fill the second recess, and depositing a coating on the new material to form the second protecting member such that the second protecting member is between the fluoropolymer seal member and the second component.

14. A method as claimed in claim 11 wherein the metal is selected from the group consisting of titanium, a titanium alloy, iron, steel, nickel, a nickel alloy, aluminum, an aluminum alloy and a metal matrix composite.

15. A method as claimed in claim 11 wherein the first protecting member is substantially U-shaped in cross-section and comprises two spaced legs, step (d) comprises positioning the first protecting member in the first recess and positioning the fluoropolymer seal member between the legs of the U-shaped cross-section first protecting member.

* * * * *